US012716108B2

(12) United States Patent
Zhao et al.

(10) Patent No.: US 12,716,108 B2
(45) Date of Patent: Aug. 25, 2026

(54) HOLLOW WIND TURBINE MAIN SHAFT AND PROFILING FORGING PROCESS AND USE THEREOF

(71) Applicant: ZENKUNG HEAVY INDUSTRY (JIANGSU) CO., LTD., Wuxi (CN)

(72) Inventors: Zhijie Zhao, Wuxi (CN); Liang Xu, Wuxi (CN); Zhenwei Yan, Wuxi (CN); Zhen Yuan, Wuxi (CN)

(73) Assignee: ZENKUNG HEAVY INDUSTRY (JIANGSU) CO., LTD., Wuxi (CN)

( * ) Notice: Subject to any disclaimer, the term of this patent is extended or adjusted under 35 U.S.C. 154(b) by 0 days.

(21) Appl. No.: 18/848,539

(22) PCT Filed: Mar. 8, 2024

(86) PCT No.: PCT/CN2024/080800

§ 371 (c)(1),
(2) Date: Sep. 19, 2024

(87) PCT Pub. No.: WO2025/091736

PCT Pub. Date: May 8, 2025

(65) Prior Publication Data

US 2026/0117334 A1 Apr. 30, 2026

(30) Foreign Application Priority Data

Oct. 31, 2023 (CN) ......................... 202311430723.0

(51) Int. Cl.

| | |
|---|---|
| ***C21D 9/28*** | (2006.01) |
| ***B21K 1/06*** | (2006.01) |
| ***C21D 7/00*** | (2006.01) |
| ***C22C 38/00*** | (2006.01) |
| ***C22C 38/02*** | (2006.01) |
| ***C22C 38/04*** | (2006.01) |
| ***C22C 38/42*** | (2006.01) |
| ***C22C 38/44*** | (2006.01) |
| ***C22C 38/46*** | (2006.01) |
| ***C22C 38/58*** | (2006.01) |
| ***C22C 38/60*** | (2006.01) |
| ***F03D 9/25*** | (2016.01) |
| ***F03D 15/00*** | (2016.01) |

(52) U.S. Cl.
CPC ................ *C21D 9/28* (2013.01); *B21K 1/063* (2013.01); *C21D 7/00* (2013.01); *C22C 38/002* (2013.01); *C22C 38/008* (2013.01); *C22C 38/02* (2013.01); *C22C 38/04* (2013.01); *C22C 38/42* (2013.01); *C22C 38/44* (2013.01); *C22C 38/46* (2013.01); *C22C 38/58* (2013.01); *C22C 38/60* (2013.01); *F03D 9/25* (2016.05); *F03D 15/00* (2016.05); *F05B 2230/25* (2013.01); *F05B 2240/61* (2013.01)

(58) Field of Classification Search
None
See application file for complete search history.

(56) References Cited

U.S. PATENT DOCUMENTS

2021/0252584 A1 8/2021 Kim et al.

FOREIGN PATENT DOCUMENTS

| | | | | | |
|---|---|---|---|---|---|
| CN | 103894792 A | | 7/2014 | | |
| CN | 106238661 A | | 12/2016 | | |
| CN | 111468668 A | | 7/2020 | | |
| CN | 112846018 A | | 5/2021 | | |
| CN | 115608908 A | * | 1/2023 | ............. | B21K 1/063 |
| CN | 115846579 A | | 3/2023 | | |
| CN | 117139548 A | | 12/2023 | | |
| WO | 2021234188 A1 | | 11/2021 | | |

* cited by examiner

*Primary Examiner* — Jenny R Wu
(74) *Attorney, Agent, or Firm* — Cooper Legal Group, LLC

(57) ABSTRACT

A hollow wind turbine main shaft and a profiling forging process and a use thereof are provided. The profiling forging process includes: step S1: smelting alloying elements according to a formula to obtain a melt, casting the melt to obtain an ingot, and hot-feeding the ingot; step S2: reheating the ingot hot-fed in the step S1, followed by primary drawing-out, primary upsetting, secondary drawing-out, and secondary upsetting to obtain a forged ingot; step S3: reheating the forged ingot, followed by punching to obtain a punched forging; step S4: reheating the punched forging, and performing drawing-out and rounding on a shaft body of the punched forging to obtain a finished forging; and step S5: placing the finished forging into a thermal insulation barrel for slow cooling, and air-cooling the finished forging to a room temperature to obtain the hollow wind turbine main shaft.

7 Claims, 2 Drawing Sheets

HOLLOW WIND TURBINE MAIN SHAFT AND PROFILING FORGING PROCESS AND USE THEREOF

CROSS REFERENCE TO THE RELATED APPLICATIONS

This application is the national phase entry of International Application No. PCT/CN2024/080800, filed on Mar. 8, 2024, which is based upon and claims priority to Chinese Patent Application No. 202311430723.0, filed on Oct. 31, 2023, the entire contents of which are incorporated herein by reference.

TECHNICAL FIELD

The present disclosure relates to a hollow wind turbine main shaft and a profiling forging process and a use thereof, and belongs to the technical field of wind turbine main shaft manufacturing.

BACKGROUND OF THE INVENTION

Under global circumstances of energy conservation and emission reduction, there has been a consensus among countries around the world to reduce the dependence on the fossil energy sources and increase the use of solar energy and wind energy. China has superior wind resources and abundant potentially exploitable resources. Wind power, as a new type of clean energy source, has become the focus of attention and development in China, and has developed extremely rapidly.

The wind turbine main shaft is an important component in the wind turbine generator system, which is used to connect a blade hub to a gearbox and serves to transfer kinetic energy. At present, the intended design life of the wind turbine generator system is twenty years. As the main stress-bearing component in the wind turbine generator system, the wind turbine main shaft has been serving in harsh environments such as low-temperature environment for a long time. The wind turbine main shaft is very prone to ductile-brittle transition, leading to a fracture and thus leading to accidents. On the other hand, the wind turbine main shaft is replaced costly and difficultly, so wind turbine manufacturers impose extremely stringent requirements on the wind turbine main shaft. Meanwhile, in recent years, the unit capacity of the wind power generation has been continuously increased, indicating the development of large-scale wind turbine generator system. In order to achieve a higher utilization rate of the wind energy, reduce the area of the wind farm, and improve the cost-effectiveness of the wind power generation, a high-capacity wind turbine generator system will become the trend of the wind power development in future. However, the development of the large-scale wind turbine generator system will inevitably require the wind turbine main shaft to serve in a harsher environment, so it is necessary for the wind turbine main shaft to have a higher low-temperature brittle fracture resistance.

Therefore, it is urgent to develop a short-flow profiling forging process of the wind turbine main shaft, in order to solve the low-temperature brittle fracture of a forging of the wind turbine main shaft.

SUMMARY OF THE INVENTION

The present disclosure is intended to provide a profiling forging process of a hollow wind turbine main shaft. In the profiling forging process, through coordinated regulation and control of composition, deformation, and temperature in combination, a complex phase structure including a matrix phase and a grain-boundary MnNi phase at a normal temperature is obtained.

Meanwhile, the present disclosure provides a hollow wind turbine main shaft having a low-temperature brittle fracture resistance.

Meanwhile, the present disclosure provides a use of the hollow wind turbine main shaft in a wind turbine generator system.

Meanwhile, the present disclosure provides a wind turbine generator system, including the hollow wind turbine main shaft according to the present disclosure.

To solve the above-mentioned technical problems, the present disclosure adopts the following technical solutions.

A profiling forging process of a hollow wind turbine main shaft is provided, including the following steps:

- step S1: billet hot-feeding: smelting alloying elements according to a formula to obtain a melt, casting the melt to obtain an ingot, and hot-feeding the ingot;
- step S2: drawing-out and upsetting: reheating the ingot hot-fed in the step S1, followed by primary drawing-out, primary upsetting, secondary drawing-out, and secondary upsetting for a forging process to obtain a forged ingot;
- step S3: ingot punching: reheating the forged ingot obtained in the step S2, followed by punching to obtain a punched forging;
- step S4: drawing-out and rounding: reheating the punched forging obtained in the step S3, and performing drawing-out and rounding on a shaft body of the punched forging to obtain a finished forging; and
- step S5: post-forging controlled cooling: placing the finished forging obtained in the step S4 into a first thermal insulation barrel for slow cooling, and air-cooling the finished forging to a room temperature to obtain the hollow wind turbine main shaft.

In the step S1, the formula includes the following alloying elements in mass percentage: C: 0.36% to 0.42%, Si: 0.15% to 0.25%, Mn: 1.21% to 1.73%, Ni: 1.27% to 2.11%, P: ≤0.02%, S: ≤0.02%, Cr: 0.91% to 1.18%, Mo: 0.22% to 0.29%, Cu: ≤0.1%, V: 0.03% to 0.12%, Sn: ≤0.002%, Sb: ≤0.001%, and Fe: the balance.

In the step S1, a mass ratio of Mn to Ni in the formula is Mn:Ni=1:(1.05-1.22).

In the step S1, the ingot is hot-fed in a second thermal insulation barrel at 850° C. to 880° C. after demoulding of the ingot.

In the step S2, before the forging process, the ingot hot-fed in the step S1 is reheated to 1,260° C. to 1,280° C. at a first heating rate of 70° C./hour to 80° C./hour for 5 hours to 6 hours.

In the step S2, the primary drawing-out, the primary upsetting, the secondary drawing-out, and the secondary upsetting are performed for the forging process, where the primary drawing-out is performed at a first forging ratio of 6.1 to 6.5, the primary upsetting is performed at a second forging ratio of 6.7 to 7.2, the secondary drawing-out is performed at a third forging ratio of 3.3 to 3.6, and the secondary upsetting is performed at a fourth forging ratio of 3.8 to 4.1; and the primary drawing-out and the primary upsetting are performed at a first temperature ranging from 1,080° C. to 1,260° C., and the secondary drawing-out and the secondary upsetting are performed at a second temperature ranging from 980° C. to 1,080° C.

In the step S3, the punching is performed with a punch pointing downward and includes a primary punching and a secondary back-side punching, where the primary punching is performed at a fourth temperature of 1,150° C. to 1,180° C. until the forged ingot is punched to a depth of ⅔ of the forged ingot; and then, the forged ingot is reheated to 1,150° C. to 1,180° C. at a third heating rate of 80° C./hour to 90° C./hour, and the forged ingot is turned 180° for the secondary back-side punching until the forged ingot is punched through.

In the step S4, the punched forging is reheated to 1,200° C. to 1,220° C. at a second heating rate of 50° C./hour to 60° C./hour and then subjected to the drawing-out; the drawing-out is performed with a first anvil width ratio of 0.6 to 0.8, a first reduction of 80 mm to 100 mm, a 90° clockwise turning mode, and a first feed of 0.4 to 0.6 of a first anvil width to obtain a drawn-out forging.

In the step S4, the drawn-out forging is subjected to the rounding, and the rounding is performed at a third temperature of 700° C. to 980° C. with a second anvil width ratio of 0.8 to 0.9, a second reduction of 10 mm to 20 mm, and a second feed of 0.7 to 0.8 of a second anvil width.

In the step S4, the drawn-out forging is reheated to 1,200° C. to 1,220° C. before the drawn-out forging is subjected to the rounding.

In the step S5, the finished forging is slowly cooled to 180° C. to 200° C. at a slow cooling rate of 5° C./hour to 10° C./hour in the first thermal insulation barrel, and taken out of the first thermal insulation barrel and air-cooled to the room temperature.

The present disclosure provides a hollow wind turbine main shaft obtained by the profiling forging process of the hollow wind turbine main shaft.

The hollow wind turbine main shaft has a grain size number of 7 to 8.

A microstructure distribution of the hollow wind turbine main shaft is a complex phase structure including a matrix phase and a grain-boundary MnNi phase.

The hollow wind turbine main shaft has a tensile strength of 921 MPa to 981 MPa, a yield strength of 803 MPa to 936 MPa, a hardness of 336 HB to 391 HB, and a −40° C. impact energy AKV/J of 105 to 109.

The present disclosure provides a use of the hollow wind turbine main shaft in a wind turbine generator system.

A wind turbine generator system is provided, including the hollow wind turbine main shaft according to the present disclosure.

The hollow wind turbine main shaft according to the present disclosure has excellent low-temperature impact properties.

Compared with the prior art, the present disclosure has the following advantages.

1. The hollow wind turbine main shaft obtained by the profiling forging process in the present disclosure has excellent low-temperature impact properties. With the high ratio of Mn to Ni, as well as the coordinated control of a step-by-step temperature change of the high temperature, the medium-high temperature and the medium temperature, and the large deformation, the medium deformation and the small deformation in the profiling forging process, the present disclosure realizes that the microstructure of the hollow wind turbine main shaft obtained by the profiling forging process is the complex phase structure including the matrix phase and the grain-boundary MnNi phase. The matrix phase has fine grains, and has the desirable strength and toughness. The grain-boundary MnNi phase has a face centered cubic (FCC) structure, and has excellent plasticity/toughness. On the one hand, since the FCC structure does not exhibit low-temperature brittleness, the MnNi phase present at the grain boundary can significantly improve the overall low-temperature toughness of the forging, thereby enhancing the low-temperature impact properties of the forging. On the other hand, the FCC structure with the excellent plasticity/toughness can effectively prevent crack propagation during the low-temperature impact, and further improve the low-temperature impact properties of the forging.

2. The complex phase structure of the hollow wind turbine main shaft obtained by the profiling forging process in the present disclosure is formed for the following reasons. Firstly, the specific high ratio of Mn to Ni in the ingot, namely Mn:Ni=1:(1.05-1.22), provides a material basis for subsequently forming the MnNi phase with the FCC structure. Secondly, the large-deformation forging process of the primary drawing-out and the primary upsetting at the high temperature (1,080° C. to 1,260° C.) allows large grains to be broken up and the diffusion rate of Mn and Ni to be accelerated. Thirdly, the medium-deformation forging process of the secondary drawing-out and the secondary upsetting at the medium-high temperature (980° C. to 1,080° C.) allows the grains in the forging to be refined to increase the density of defects such as grain boundaries, and allows Mn and Ni to be enriched at the high-free-energy grain boundaries to form Mn—Ni-enriched regions. Fourthly, the low-deformation forging process of the drawing-out and the rounding at the medium temperature (700° C. to 980° C.) promotes the nucleation and growth of the MnNi phase in the Mn—Ni-enriched regions at the grain boundaries, finally forming the microstructure with the FCC structure.

3. During the preparation process, the MnNi phase with the FCC structure that is stable at the normal temperature can be formed in the hollow wind turbine main shaft obtained by the profiling forging process in the present disclosure. Typically, the phase with the FCC structure formed at the high temperature will undergo phase change and change into other crystal structures during heat treatment or cooling process due to high stacking fault energy (SFE) in the structure. For example, during cooling process, the austenite with the FCC structure in low-carbon steel changes into the martensite with the body-centered cubic (BCC) structure, and so on. However, with the high ratio of Mn to Ni, the present disclosure improves the stability of the FCC structure in the material system, and provides the material basis for forming the MnNi phase with the FCC structure at the normal temperature. Subsequently, in the preparation process, through temperature control and deformation control, namely the large-deformation forging process of the primary drawing-out and the primary upsetting at the high temperature and the medium-deformation forging process of the secondary drawing-out and the secondary upsetting at the medium-high temperature, the present disclosure provides sufficient conditions continuously for the material to undergo multiple distortion and dynamic recrystallization processes, thereby reducing the stacking faults, reducing the SFE, and producing the stacking fault energy effect. Finally, in the low-deformation forging process of the drawing-out and the rounding at the medium temperature, the specific temperature and specific deformation are maintained while shaping. Therefore, the low-SFE grains grow continuously, and the SFE is reduced continuously, enhancing the stability of the FCC structure. Through coordinated regulation and control of composition, deformation, and temperature in combination, the complex phase structure of the present disclosure at the normal temperature is obtained.

DETAILED DESCRIPTION OF THE INVENTION

Figure 1:
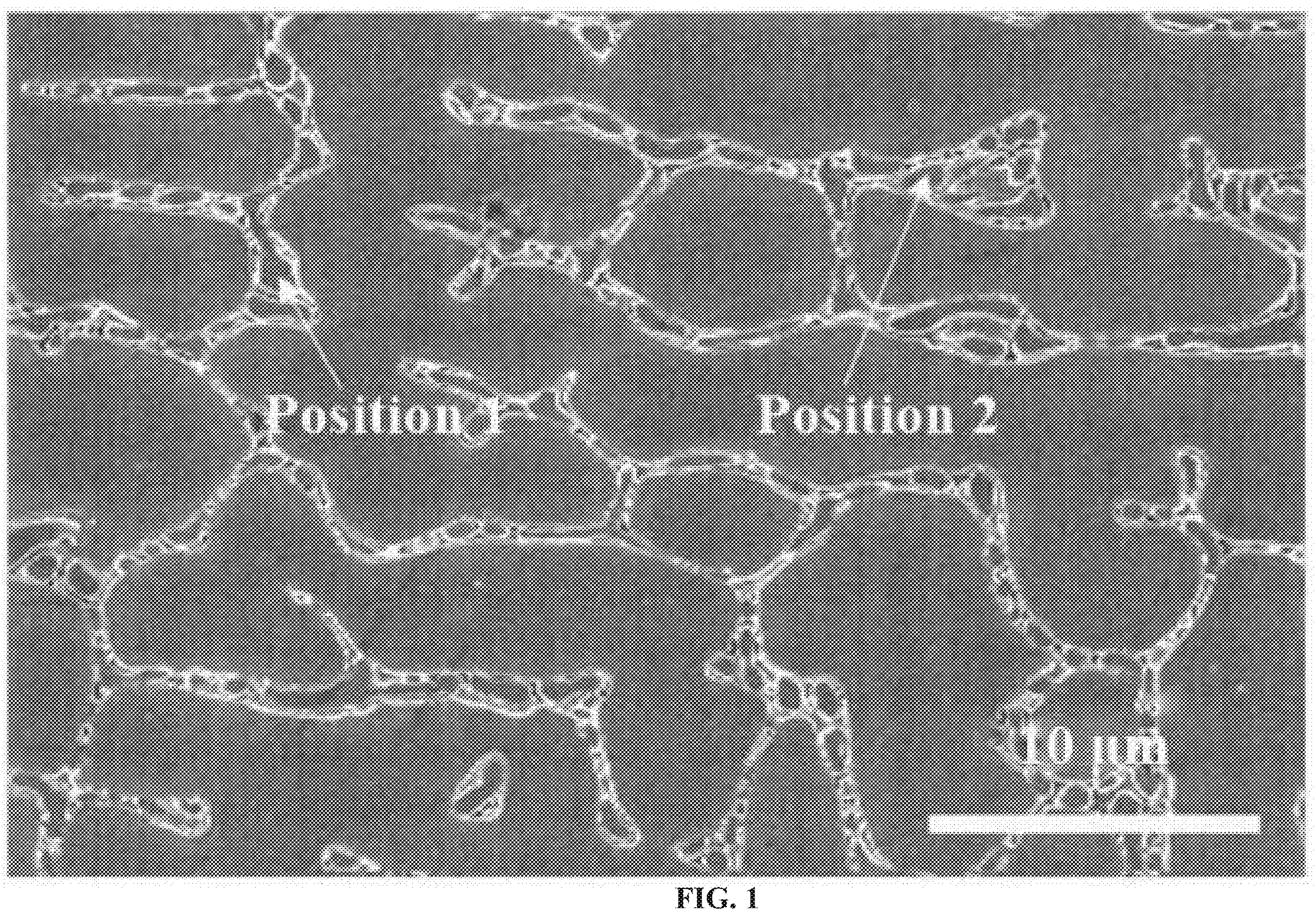
FIG. 1 illustrates a microstructure of a hollow wind turbine main shaft according to the present disclosure.

The present disclosure is further described in detail below with reference to the accompanying drawings and specific examples. The following examples are only intended to illustrate the present disclosure, rather than to limit the scope of the present disclosure.

Example 1

A profiling forging process of a hollow wind turbine main shaft included the following steps.

Step S1: Billet hot-feeding: Alloying elements were smelted according to a formula to obtain a melt, the melt was casted to obtain an ingot, and the ingot was hot-fed. The ingot was hot-fed in a thermal insulation barrel at 850° C. after demoulding of the ingot. The formula included the following alloying elements in mass percentage: C: 0.36%, Si: 0.15%, Mn: 1.21%, Ni: 1.27%, P: 0.02%, S: 0.02%, Cr: 0.91%, Mo: 0.22%, Cu: 0.1%, V: 0.03%, Sn: 0.002%, Sb: 0.001%, and Fe: the balance. A mass ratio of Mn to Ni in the formula was Mn:Ni=1:1.05.

Step S2: Drawing-out and upsetting: The ingot hot-fed in the step S1 was reheated, and subjected to primary drawing-out, primary upsetting, secondary drawing-out, and secondary upsetting for a forging process to obtain a forged ingot. Before the forging process, the ingot hot-fed in the step S1 was reheated to 1,260° C. at a heating rate of 70° C./hour for 5 hours.

The primary drawing-out was performed at a forging ratio of 6.1, the primary upsetting was performed at a forging ratio of 6.7, the secondary drawing-out was performed at a forging ratio of 3.3, and the secondary upsetting was performed at a forging ratio of 3.8. The primary drawing-out and the primary upsetting were performed at 1,080° C., and the secondary drawing-out and the secondary upsetting were performed at 980° C.

Step S3: Ingot punching: The forged ingot obtained in the step S2 was reheated, and subjected to punching to obtain a punched forging. The punching was performed with a punch pointing downward and included a primary punching and a secondary back-side punching. The primary punching was performed at a temperature of 1,150° C. until the forged ingot was punched to a depth of ⅔ of the forged ingot. Then, the forged ingot was reheated to 1,150° C. at a heating rate of 80° C./hour. The forged ingot was turned 180° for the secondary back-side punching until the forged ingot was punched through.

Step S4: Drawing-out and rounding: The punched forging obtained in the step S3 was reheated, and subjected to drawing-out and rounding on a shaft body of the punched forging to obtain a finished forging. The punched forging was reheated to 1,200° C. at a heating rate of 50° C./hour and then subjected to the drawing-out. The drawing-out was performed with an anvil width ratio of 0.6, a reduction of 80 mm, a 90° clockwise turning mode, and a feed of 0.4 of an anvil width to obtain a drawn-out forging. The drawn-out forging was reheated to 1,200° C. before the drawn-out forging was subjected to the rounding. The rounding was performed at a temperature of 700° C. with an anvil width ratio of 0.8, a reduction of 10 mm, and a feed of 0.7 of an anvil width.

Step S5: Post-forging controlled cooling: The finished forging obtained in the step S4 was placed into a thermal insulation barrel for slow cooling, and air-cooled to a room temperature to obtain the hollow wind turbine main shaft. The finished forging was slowly cooled to 180° C. at a slow cooling rate of 5° C./hour in the thermal insulation barrel, and taken out of the thermal insulation barrel and air-cooled to the room temperature.

This example provided a hollow wind turbine main shaft obtained by the profiling forging process of the hollow wind turbine main shaft.

A microstructure distribution of the hollow wind turbine main shaft was a complex phase structure including a matrix phase and a grain-boundary MnNi phase.

This example provided a use of the hollow wind turbine main shaft in a wind turbine generator system.

A wind turbine generator system was provided, including the hollow wind turbine main shaft obtained in this example.

As can be seen from FIG. 1, the hollow wind turbine main shaft obtained in this example has a small grain size. The grain size is 5 μm to 30 μm, and the grain size number is 7 or more.

The complex phase structure can further be seen from FIG. 1, in which the gray region is the matrix phase, and the spot regions (position 2) and the bulk regions (position 1) in the grain boundaries are the MnNi phase, indicating that the complex phase structure including the matrix phase and the grain-boundary MnNi phase at a normal temperature is obtained in this example.

Electron probe microanalysis (EPMA) was conducted on the spot regions (position 2) and the bulk regions (position 1) in FIG. 1, with data being shown in Table 1 below.

TABLE 1

EPMA conducted on the spot regions and the bulk regions in Example 1.

| EPMA (wt. %) | | Position 1 | Position 2 |
|---|---|---|---|
| Element distribution (wt. %) | Fe | 1.72 | 2.63 |
| | Mn | 47.52 | 46.27 |
| | Ni | 50.68 | 51.04 |
| | Cr | 0.08 | 0.06 |
| Chemical formula of the phase | | MnNi | MnNi |

It can be seen that the MnNi phase at the normal temperature is obtained in this example.

Example 2

A profiling forging process of a hollow wind turbine main shaft included the following steps.

Step S1: Billet hot-feeding: Alloying elements were smelted according to a formula to obtain a melt, the melt was casted to obtain an ingot, and the ingot was hot-fed. The ingot was hot-fed in a thermal insulation barrel at 865° C. after demoulding of the ingot. The formula included the following alloying elements in mass percentage: C: 0.40%, Si: 0.20%, Mn: 1.50%, Ni: 1.65%, P: 0.01%, S: 0.01%, Cr: 1.05%, Mo: 0.25%, Cu: 0.05%, V: 0.08%, Sn: 0.001%, Sb: 0.0005%, and Fe: the balance. A mass ratio of Mn to Ni in the formula was Mn:Ni=1:1.1.

Step S2: Drawing-out and upsetting: The ingot hot-fed in the step S1 was reheated, and subjected to primary drawing-out, primary upsetting, secondary drawing-out, and secondary upsetting for a forging process to obtain a forged ingot. Before the forging process, the ingot hot-fed in the step S1 was reheated to 1,270° C. at a heating rate of 75° C./hour for 5.5 hours.

The primary drawing-out was performed at a forging ratio of 6.3, the primary upsetting was performed at a forging ratio of 7.0, the secondary drawing-out was performed at a forging ratio of 3.45, and the secondary upsetting was performed at a forging ratio of 3.9. The primary drawing-out and the primary upsetting were performed at 1,190° C., and the secondary drawing-out and the secondary upsetting were performed at 1,050° C.

Step S3: Ingot punching: The forged ingot obtained in the step S2 was reheated, and subjected to punching to obtain a punched forging. The punching was performed with a punch pointing downward and included a primary punching and a secondary back-side punching. The primary punching was performed at a temperature of 1,165° C. until the forged ingot was punched to a depth of ⅔ of the forged ingot. Then, the forged ingot was reheated to 1,165° C. at a heating rate of 85° C./hour. The forged ingot was turned 180° for the secondary back-side punching until the forged ingot was punched through.

Step S4: Drawing-out and rounding: The punched forging obtained in the step S3 was reheated, and subjected to drawing-out and rounding on a shaft body of the punched forging to obtain a finished forging. The punched forging was reheated to 1,210° C. at a heating rate of 55° C./hour and then subjected to the drawing-out. The drawing-out was performed with an anvil width ratio of 0.7, a reduction of 90 mm, a 90° clockwise turning mode, and a feed of 0.5 of an anvil width to obtain a drawn-out forging. The drawn-out forging was reheated to 1,210° C. before the drawn-out forging was subjected to the rounding. The rounding was performed at a temperature of 850° C. with an anvil width ratio of 0.85, a reduction of 15 mm, and a feed of 0.75 of an anvil width.

Step S5: Post-forging controlled cooling: The finished forging obtained in the step S4 was placed into a thermal insulation barrel for slow cooling, and air-cooled to a room temperature to obtain the hollow wind turbine main shaft. The finished forging was slowly cooled to 190° C. at a slow cooling rate of 7° C./hour in the thermal insulation barrel, and taken out of the thermal insulation barrel and air-cooled to the room temperature.

This example provided a hollow wind turbine main shaft obtained by the profiling forging process of the hollow wind turbine main shaft.

A microstructure distribution of the hollow wind turbine main shaft was a complex phase structure including a matrix phase and a grain-boundary MnNi phase.

This example provided a use of the hollow wind turbine main shaft in a wind turbine generator system.

A wind turbine generator system was provided, including the hollow wind turbine main shaft obtained in this example.

Example 3

A profiling forging process of a hollow wind turbine main shaft included the following steps.

Step S1: Billet hot-feeding: Alloying elements were smelted according to a formula to obtain a melt, the melt was casted to obtain an ingot, and the ingot was hot-fed. The ingot was hot-fed in a thermal insulation barrel at 880° C. after demoulding of the ingot. The formula included the following alloying elements in mass percentage: C: 0.42%, Si: 0.25%, Mn: 1.73%, Ni: 2.11%, P: 0.005%, S: 0.02%, Cr: 1.18%, Mo: 0.29%, Cu: 0.01%, V: 0.12%, Sn: 0.001%, Sb: 0.001%, and Fe: the balance. A mass ratio of Mn to Ni in the formula was Mn:Ni=1:1.22.

Step S2: Drawing-out and upsetting: The ingot hot-fed in the step S1 was reheated, and subjected to primary drawing-out, primary upsetting, secondary drawing-out, and secondary upsetting for a forging process to obtain a forged ingot. Before the forging process, the ingot hot-fed in the step S1 was reheated to 1,280° C. at a heating rate of 80° C./hour for 6 hours.

The primary drawing-out was performed at a forging ratio of 6.5, the primary upsetting was performed at a forging ratio of 7.2, the secondary drawing-out was performed at a forging ratio of 3.6, and the secondary upsetting was performed at a forging ratio of 4.1. The primary drawing-out and the primary upsetting were performed at 1,260° C., and the secondary drawing-out and the secondary upsetting were performed at 1,080° C.

Step S3: Ingot punching: The forged ingot obtained in the step S2 was reheated, and subjected to punching to obtain a punched forging. The punching was performed with a punch pointing downward and included a primary punching and a secondary back-side punching. The primary punching was performed at a temperature of 1,180° C. until the forged ingot was punched to a depth of ⅔ of the forged ingot. Then, the forged ingot was reheated to 1,180° C. at a heating rate of 90° C./hour. The forged ingot was turned 180° for the secondary back-side punching until the forged ingot was punched through.

Step S4: Drawing-out and rounding: The punched forging obtained in the step S3 was reheated, and subjected to drawing-out and rounding on a shaft body of the punched forging to obtain a finished forging. The punched forging was reheated to 1,220° C. at a heating rate of 60° C./hour and then subjected to the drawing-out. The drawing-out was performed with an anvil width ratio of 0.8, a reduction of 100 mm, a 90° clockwise turning mode, and a feed of 0.6 of an anvil width to obtain a drawn-out forging. The drawn-out forging was reheated to 1,220° C. before the drawn-out forging was subjected to the rounding. The rounding was performed at a temperature of 980° C. with an anvil width ratio of 0.9, a reduction of 20 mm, and a feed of 0.8 of an anvil width.

Step S5: Post-forging controlled cooling: The finished forging obtained in the step S4 was placed into a thermal insulation barrel for slow cooling, and air-cooled to a room temperature to obtain the hollow wind turbine main shaft. The finished forging was slowly cooled to 200° C. at a slow cooling rate of 10° C./hour in the thermal insulation barrel, and taken out of the thermal insulation barrel and air-cooled to the room temperature.

This example provided a hollow wind turbine main shaft obtained by the profiling forging process of the hollow wind turbine main shaft.

A microstructure distribution of the hollow wind turbine main shaft was a complex phase structure including a matrix phase and a grain-boundary MnNi phase.

This example provided a use of the hollow wind turbine main shaft in a wind turbine generator system.

A wind turbine generator system was provided, including the hollow wind turbine main shaft obtained in this example.

Comparative Example 1

A profiling forging process of a hollow wind turbine main shaft included the following steps.

Step S1: Billet hot-feeding: Alloying elements were smelted according to a formula to obtain a melt, the melt was casted to obtain an ingot, and the ingot was hot-fed. The ingot was hot-fed in a thermal insulation barrel at 850° C. after demoulding of the ingot. The formula included the following alloying elements in mass percentage: C: 0.36%, Si: 0.15%, Mn: 1.21%, Ni: 1.27%, P: 0.02%, S: 0.02%, Cr: 0.91%, Mo: 0.22%, Cu: 0.1%, V: 0.03%, Sn: 0.002%, Sb: 0.001%, and Fe: the balance. A mass ratio of Mn to Ni in the formula was Mn:Ni=1:1.05.

Step S2: Drawing-out and upsetting: The ingot hot-fed in the step S1 was reheated, and subjected to primary drawing-out, primary upsetting, secondary drawing-out, and secondary upsetting for a forging process to obtain a forged ingot. Before the forging process, the ingot hot-fed in the step S1 was reheated to 1,260° C. at a heating rate of 70° C./hour for 5 hours.

The primary drawing-out was performed at a forging ratio of 6.1, the primary upsetting was performed at a forging ratio of 6.7, the secondary drawing-out was performed at a forging ratio of 3.3, and the secondary upsetting was performed at a forging ratio of 3.8. The primary drawing-out and the primary upsetting were performed at 1,080° C., and the secondary drawing-out and the secondary upsetting were performed at 980° C.

Step S3: Ingot punching: The forged ingot obtained in the step S2 was reheated, and subjected to punching to obtain a punched forging. The punching was performed with a punch pointing downward and included a primary punching and a secondary back-side punching. The primary punching was performed at a temperature of 1,150° C. until the forged ingot was punched to a depth of ⅔ of the forged ingot. Then, the forged ingot was reheated to 1,150° C. at a heating rate of 80° C./hour. The forged ingot was turned 180° for the secondary back-side punching until the forged ingot was punched through.

Step S4: Drawing-out and rounding: The punched forging obtained in the step S3 was reheated, and subjected to drawing-out and rounding on a shaft body of the punched forging to obtain a finished forging. The punched forging was reheated to 1,200° C. at a heating rate of 50° C./hour and then subjected to the drawing-out. The drawing-out was performed with an anvil width ratio of 0.6, a reduction of 80 mm, a 90° clockwise turning mode, and a feed of 0.4 of an anvil width to obtain a drawn-out forging. The drawn-out forging was reheated to 1,200° C. before the drawn-out forging was subjected to the rounding. The rounding was performed at a temperature of 1,000° C. with an anvil width ratio of 0.8, a reduction of 10 mm, and a feed of 0.7 of an anvil width.

Step S5: Post-forging controlled cooling: The finished forging obtained in the step S4 was placed into a thermal insulation barrel for slow cooling, and air-cooled to a room temperature to obtain the hollow wind turbine main shaft. The finished forging was slowly cooled to 180° C. at a slow cooling rate of 5° C./hour in the thermal insulation barrel, and taken out of the thermal insulation barrel and air-cooled to the room temperature.

Comparative Example 2

A profiling forging process of a hollow wind turbine main shaft included the following steps.

Step S1: Billet hot-feeding: Alloying elements were smelted according to a formula to obtain a melt, the melt was casted to obtain an ingot, and the ingot was hot-fed. The ingot was hot-fed in a thermal insulation barrel at 850° C. after demoulding of the ingot. The formula included the following alloying elements in mass percentage: C: 0.36%, Si: 0.15%, Mn: 1.21%, Ni: 1.27%, P: 0.02%, S: 0.02%, Cr: 0.91%, Mo: 0.22%, Cu: 0.1%, V: 0.03%, Sn: 0.002%, Sb: 0.001%, and Fe: the balance. A mass ratio of Mn to Ni in the formula was Mn:Ni=1:1.05.

Step S2: Drawing-out and upsetting: The ingot hot-fed in the step S1 was reheated, and subjected to primary drawing-out, primary upsetting, secondary drawing-out, and secondary upsetting for a forging process to obtain a forged ingot. Before the forging process, the ingot hot-fed in the step S1 was reheated to 1,260° C. at a heating rate of 70° C./hour for 5 hours.

The primary drawing-out was performed at a forging ratio of 6.1, the primary upsetting was performed at a forging ratio of 6.7, the secondary drawing-out was performed at a forging ratio of 6.0, and the secondary upsetting was performed at a forging ratio of 6.5. The primary drawing-out and the primary upsetting were performed at 1,080° C. After the primary drawing-out and the primary upsetting were completed, the ingot was reheated to 1,260° C. at a heating rate of 70° C./hour before the secondary drawing-out and the secondary upsetting. Then, the secondary drawing-out and the secondary upsetting were performed at 1,180° C.

Step S3: Ingot punching: The forged ingot obtained in the step S2 was reheated, and subjected to punching to obtain a punched forging. The punching was performed with a punch pointing downward and included a primary punching and a secondary back-side punching. The primary punching was performed at a temperature of 1,150° C. until the forged ingot was punched to a depth of ⅔ of the forged ingot. Then, the forged ingot was reheated to 1,150° C. at a heating rate of 80° C./hour. The forged ingot was turned 180° for the secondary back-side punching until the forged ingot was punched through.

Step S4: Drawing-out and rounding: The punched forging obtained in the step S3 was reheated, and subjected to drawing-out and rounding on a shaft body of the punched forging to obtain a finished forging. The punched forging was reheated to 1,200° C. at a heating rate of 50° C./hour and then subjected to the drawing-out. The drawing-out was performed with an anvil width ratio of 0.6, a reduction of 80 mm, a 90° clockwise turning mode, and a feed of 0.4 of an anvil width to obtain a drawn-out forging. The drawn-out forging was reheated to 1,200° C. before the drawn-out forging was subjected to the rounding. The rounding was performed at a temperature of 700° C. with an anvil width ratio of 0.8, a reduction of 10 mm, and a feed of 0.7 of an anvil width.

Step S5: Post-forging controlled cooling: The finished forging obtained in the step S4 was placed into a thermal insulation barrel for slow cooling, and air-cooled to a room temperature to obtain the hollow wind turbine main shaft. The finished forging was slowly cooled to 180° C. at a slow cooling rate of 5° C./hour in the thermal insulation barrel, and taken out of the thermal insulation barrel and air-cooled to the room temperature.

Comparative Example 3

A profiling forging process of a hollow wind turbine main shaft included the following steps.

Step S1: Billet hot-feeding: Alloying elements were smelted according to a formula to obtain a melt, the melt was casted to obtain an ingot, and the ingot was hot-fed. The ingot was hot-fed in a thermal insulation barrel at 850° C. after demoulding of the ingot. The formula included the following alloying elements in mass percentage: C: 0.36%, Si: 0.15%, Mn: 1.21%, Ni: 1.27%, P: 0.02%, S: 0.02%, Cr: 0.91%, Mo: 0.22%, Cu: 0.1%, V: 0.03%, Sn: 0.002%, Sb: 0.001%, and Fe: the balance. A mass ratio of Mn to Ni in the formula was Mn:Ni=1:1.05.

Step S2: Drawing-out and upsetting: The ingot hot-fed in the step S1 was reheated, and subjected to primary drawing-out, primary upsetting, secondary drawing-out, and secondary upsetting for a forging process to obtain a forged ingot. Before the forging process, the ingot hot-fed in the step S1 was reheated to 1,260° C. at a heating rate of 70° C./hour for 5 hours.

The primary drawing-out was performed at a forging ratio of 5.0, the primary upsetting was performed at a forging ratio of 5.5, the secondary drawing-out was performed at a forging ratio of 3.3, and the secondary upsetting was performed at a forging ratio of 3.8. The primary drawing-out and the primary upsetting were performed at 960° C. After the primary drawing-out and the primary upsetting were completed, the ingot was reheated to 1,260° C. at a heating rate of 70° C./hour before the secondary drawing-out and the secondary upsetting. Then, the secondary drawing-out and the secondary upsetting were performed at 980° C.

Step S3: Ingot punching: The forged ingot obtained in the step S2 was reheated, and subjected to punching to obtain a punched forging. The punching was performed with a punch pointing downward and included a primary punching and a secondary back-side punching. The primary punching was performed at a temperature of 1,150° C. until the forged ingot was punched to a depth of ⅔ of the forged ingot. Then, the forged ingot was reheated to 1,150° C. at a heating rate of 80° C./hour. The forged ingot was turned 180° for the secondary back-side punching until the forged ingot was punched through.

Step S4: Drawing-out and rounding: The punched forging obtained in the step S3 was reheated, and subjected to drawing-out and rounding on a shaft body of the punched forging to obtain a finished forging. The punched forging was reheated to 1,200° C. at a heating rate of 50° C./hour and then subjected to the drawing-out. The drawing-out was performed with an anvil width ratio of 0.6, a reduction of 80 mm, a 90° clockwise turning mode, and a feed of 0.4 of an anvil width to obtain a drawn-out forging. The drawn-out forging was reheated to 1,200° C. before the drawn-out forging was subjected to the rounding. The rounding was performed at a temperature of 700° C. with an anvil width ratio of 0.8, a reduction of 10 mm, and a feed of 0.7 of an anvil width.

Step S5: Post-forging controlled cooling: The finished forging obtained in the step S4 was placed into a thermal insulation barrel for slow cooling, and air-cooled to a room temperature to obtain the hollow wind turbine main shaft. The finished forging was slowly cooled to 180° C. at a slow cooling rate of 5° C./hour in the thermal insulation barrel, and taken out of the thermal insulation barrel and air-cooled to the room temperature.

Figure 2:
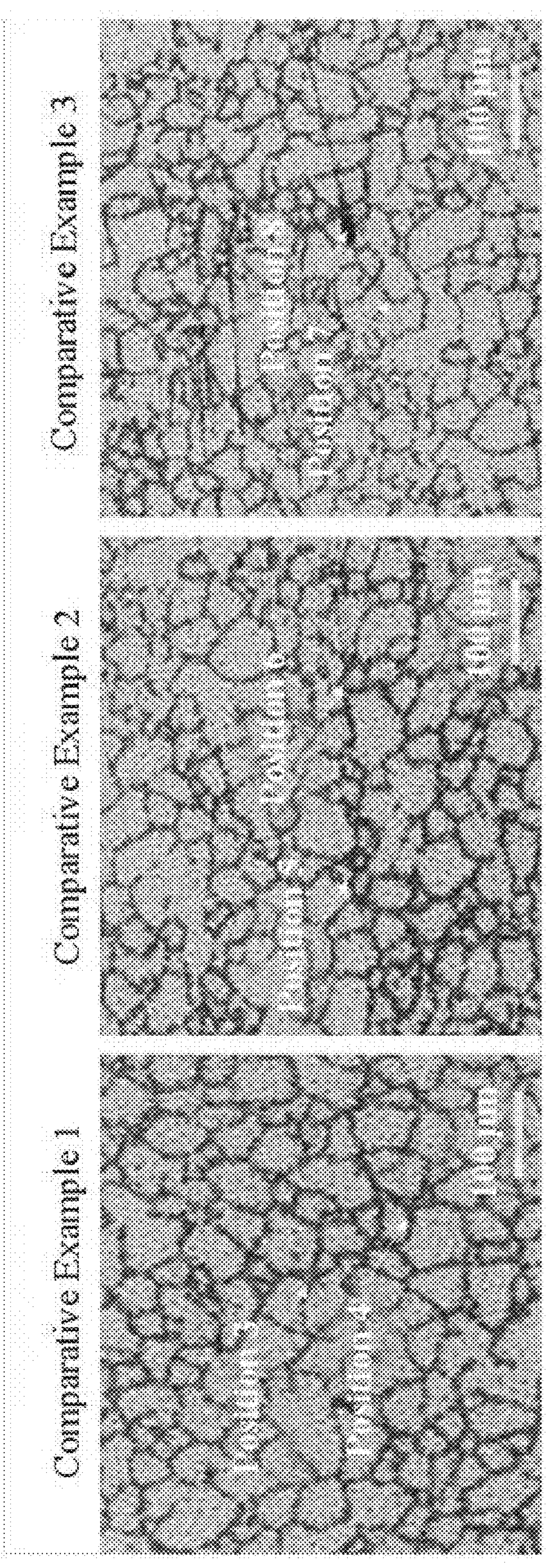
FIG. 2 illustrates microstructures of comparative examples.

FIG. 2 illustrates a microstructure of each of the hollow wind turbine main shafts obtained in Comparative Example 1 to Comparative Example 3. As can be seen from FIG. 2, in the comparative examples, only the matrix phase exists, the black regions are the grain boundaries, no MnNi phase exists, and the grain size is 50 μm to 150 μm.

The EPMA was conducted on the black regions in Comparative Example 1 to Comparative Example 3, with data being shown in Table 2 below.

TABLE 2

EPMA conducted on the black regions in comparative examples

| EPMA (wt. %) | | Position 3 | Position 4 | Position 5 | Position 6 | Position 7 | Position 8 |
|---|---|---|---|---|---|---|---|
| Element distribution (wt. %) | Mn | 1.79 | 1.92 | 1.27 | 1.55 | 1.59 | 1.91 |
| | Ni | 1.29 | 1.84 | 2.11 | 2.10 | 1.98 | 1.37 |
| | Cr | 1.11 | 0.99 | 1.03 | 1.17 | 0.95 | 1.15 |
| | Fe | The balance | | | | | |

As can be seen, the MnNi phase at the normal temperature was not obtained in the comparative examples, such that the overall low-temperature toughness of the forgings cannot be improved, and the low-temperature impact properties of the forgings cannot be enhanced.

Table 3 below shows performance comparison results.

The hollow wind turbine main shafts obtained in Example 1 to Example 3 and the hollow wind turbine main shafts obtained in Comparative Example 1 to Comparative Example 3 were tested in mechanical performance, with results being shown as follows.

TABLE 3

Performance table of the hollow wind turbine main shafts

| Serial No. | Tensile strength (MPa) | Yield strength (MPa) | Hardness HB | −40° C. impact energy AKV/J |
|---|---|---|---|---|
| Example 1 | 921 | 803 | 336 | 107 |
| Example 2 | 981 | 859 | 391 | 105 |
| Example 3 | 956 | 936 | 352 | 109 |
| Comparative Example 1 | 782 | 633 | 257 | 77 |
| Comparative Example 2 | 795 | 648 | 271 | 78 |
| Comparative Example 3 | 773 | 611 | 249 | 75 |

It should be understood that, in order to simplify the present disclosure and help understand one or more aspects of the present disclosure, in the above description of exemplary examples of the present disclosure, various features of the present disclosure are sometimes grouped together into a single example, figure, or description thereof. However, the method of the present disclosure should not be interpreted as reflecting the intention that the claimed present disclosure has features more than the features expressly stated in each claim. More precisely, as reflected in the claims, each aspect of the present disclosure has features less than all features of the examples disclosed above. Therefore, the claims following specific examples are hereby expressly incorporated into the specific examples, where each claim itself serves as a separate example of the present disclosure.

Although the present disclosure is described according to the limited number of examples, those skilled in the art appreciate that other examples may be conceived from the above description within the defined scope of the present disclosure. In addition, it should be noted that the language used in this specification is selected primarily for readability and teaching, but not for explaining or defining the subject of the present disclosure. Thus, without departing from the scope and spirit of the appended claims, many modifications and changes are apparent to those of ordinary skill in the art. Within the scope of the present disclosure, the disclosure of the present disclosure is illustrative rather than restrictive. The scope of the present disclosure is defined by the appended claims.

The above is only the preferred implementations of the present disclosure. It should be noted that those skilled in the art may make several improvements and modifications without departing from the principle of the present disclosure, and these improvements and modifications should also be deemed as falling within the protection scope of the present disclosure.

What is claimed is:

1. A profiling forging process of a hollow wind turbine main shaft, comprising the following steps:

step S1: billet hot-feeding: smelting alloying elements according to a formula to obtain a melt, casting the melt to obtain an ingot, and hot-feeding the ingot, wherein a mass ratio of Mn to Ni is in a range of 1:1.05 to 1:1.22;

step S2: drawing-out and upsetting: reheating the ingot hot-fed in the step S1, followed by primary drawing-out, primary upsetting, secondary drawing-out, and secondary upsetting for a forging process to obtain a forged ingot, wherein before the forging process, the ingot hot-fed in the step S1 is reheated to 1,260° C. to 1,280° C. at a first heating rate of 70° C./hour to 80° C./hour for 5 hours to 6 hours; and the primary drawing-out is performed at a first forging ratio of 6.1 to 6.5, the primary upsetting is performed at a second forging ratio of 6.7 to 7.2, the secondary drawing-out is performed at a third forging ratio of 3.3 to 3.6, and the secondary upsetting is performed at a fourth forging ratio of 3.8 to 4.1; and the primary drawing-out and the primary upsetting are performed at a first temperature ranging from 1,080° C. to 1,260° C., and the secondary drawing-out and the secondary upsetting are performed at a second temperature ranging from 980° C. to 1,080° C.;

step S3: ingot punching: reheating the forged ingot obtained in the step S2, followed by punching to obtain a punched forging;

step S4: drawing-out and rounding: reheating the punched forging obtained in the step S3, and performing drawing-out and rounding on a shaft body of the punched forging to obtain a finished forging, wherein the punched forging is reheated to 1,200° C. to 1,220° C. at a second heating rate of 50° C./hour to 60° C./hour and then subjected to the drawing out; the drawing-out is performed with a first anvil width ratio of 0.6 to 0.8, a first reduction of 80 mm to 100 mm, a 90° clockwise turning mode, and a first feed of 0.4 to 0.6 of a first anvil width to obtain a drawn-out forging; the drawn-out forging is reheated to 1,200° C. to 1,220° C. before the drawn-out forging is subjected to the rounding; and the rounding is performed at a third temperature of 700° C. to 980° C. with a second anvil width ratio of 0.8 to 0.9, a second reduction of 10 mm to 20 mm, and a second feed of 0.7 to 0.8 of a second anvil width; and step S5: post-forging controlled cooling: placing the finished forging obtained in the step S4 into a first thermal insulation barrel for cooling, and air-cooling the finished forging to a room temperature to obtain the hollow wind turbine main shaft.

2. The profiling forging process of the hollow wind turbine main shaft according to claim 1, wherein the formula comprises the following alloying elements in mass percentage: C: 0.36% to 0.42%, Si: 0.15% to 0.25%, Mn: 1.21% to 1.73%, Ni: 1.27% to 2.11%, P: ≤0.02%, S: ≤0.02%, Cr: 0.91% to 1.18%, Mo: 0.22% to 0.29%, Cu: ≤0.1%, V: 0.03% to 0.12%, Sn: ≤0.002%, Sb: ≤0.001%, and Fe: the balance.

3. The profiling forging process of the hollow wind turbine main shaft according to claim 1, wherein in the step S1, the ingot is hot-fed in a second thermal insulation barrel at 850° C. to 880° C. after demoulding of the ingot.

4. The profiling forging process of the hollow wind turbine main shaft according to claim 1, wherein in the step S3, the punching is performed with a punch pointing downward and comprises a primary punching and a secondary back-side punching, wherein the primary punching is performed at a fourth temperature of 1,150° C. to 1,180° C. until the forged ingot is punched to a depth of ⅔ of the forged ingot; and then, the forged ingot is reheated to 1,150° C. to 1,180° C. at a third heating rate of 80° C./hour to 90° C./hour, and the forged ingot is turned 180° for the secondary back-side punching until the forged ingot is punched through.

5. The profiling forging process of the hollow wind turbine main shaft according to claim 1, wherein in the step S5, the finished forging is cooled to 180° C. to 200° C. at a cooling rate of 5° C./hour to 10° C./hour in the first thermal insulation barrel, and taken out of the first thermal insulation barrel and air-cooled to the room temperature.

6. The profiling forging process of the hollow wind turbine main shaft according to claim 1, wherein a microstructure distribution of the hollow wind turbine main shaft is a complex phase structure comprising a matrix phase and a grain-boundary MnNi phase.

7. The profiling forging process of the hollow wind turbine main shaft according to claim 1, wherein the hollow wind turbine main shaft has a tensile strength of 921 MPa to 981 MPa, a yield strength of 803 MPa to 936 MPa, a hardness of 336 HB to 391 HB, and a −40° C. impact energy AKV/J of 105 to 109.

* * * * *